Patented Oct. 1, 1940

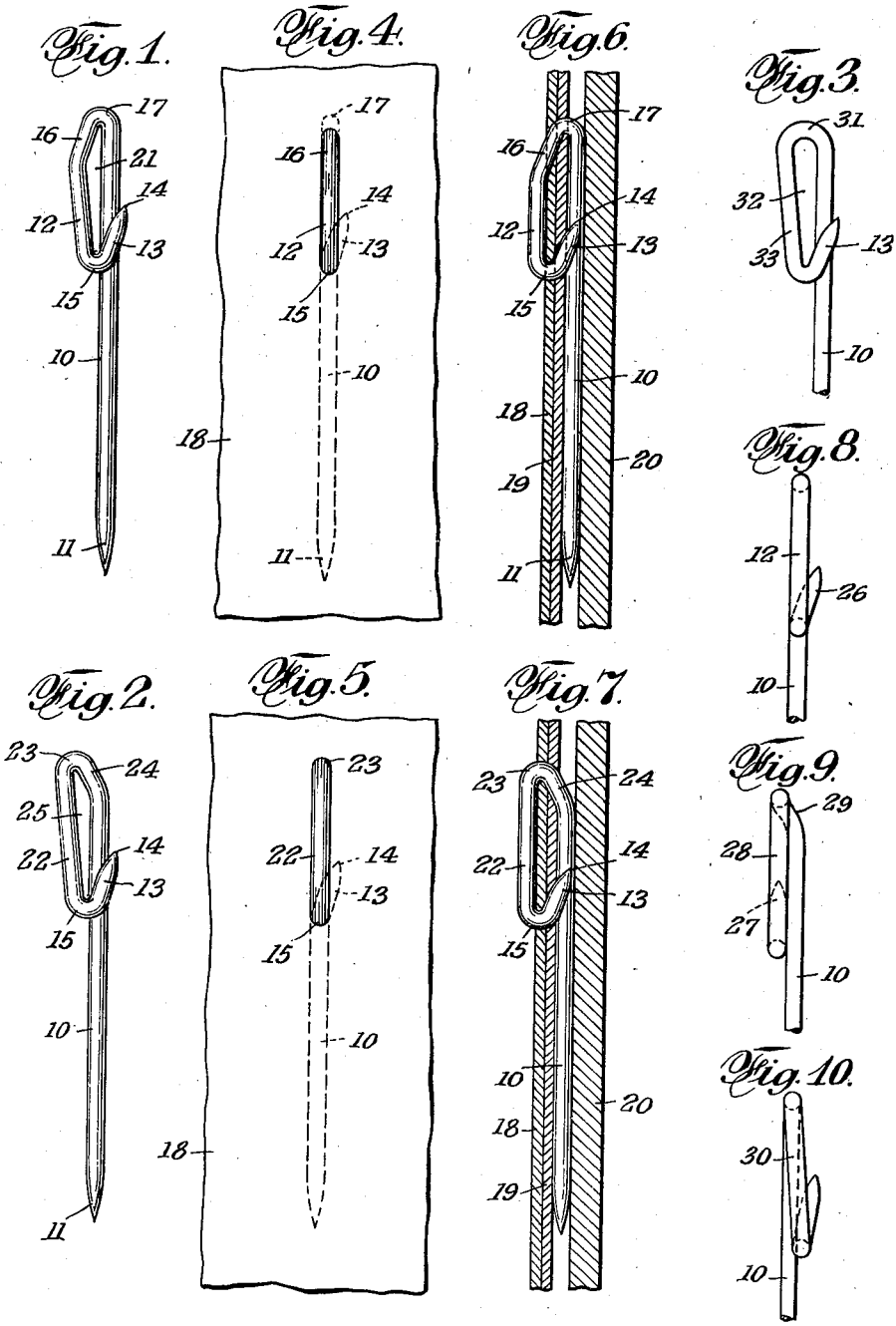

2,216,479

UNITED STATES PATENT OFFICE 2,216,479

RETAINING PIN

Daniel I. Reiter, New York, N. Y.

Application January 27, 1940, Serial No. 315,899

5 Claims. (Cl. 24—152)

This invention relates to pin fasteners such as those designed to secure in place the fabric slip covers for the upholstery of automobiles. Such fasteners have been provided with means in the form of a secondary pin, spur or prong for preventing accidental retraction of the fastener after it has once been inserted in place.

The pin fasteners of this type which have been heretofore used have been provided with a cap or a head of some form extending transversely on both sides of the pin since it has been deemed essential to provide such head or cap not only to limit the distance which the pin may enter into the material which it holds but also to provide a finger-hold means for manipulating the fastener.

I have found however, that such transversely extending heads or caps may be dispensed with without sacrificing any of the advantages of the fastener and without interfering with its proper functions, but instead resulting in added advantages.

My invention therefore contemplates the provision of a fastener including a main pin part and a secondary pin part made of a single length of wire and devoid of a head or cap but so shaped that the fastener may readily be inserted in place in the material to its limit and when so inserted presents to view only a short length of wire which is practically undetectable and invisible and which is part of a loop replacing the head.

My invention further contemplates the provission of a wire pin fastener having a substantially straight and short doubled-back portion at its unpointed end, said portion being part of a loop and terminating in a secondary pin bent at any desired effective angle to the main pin, said portion lying when the fastener is operative, flat on and in direct contact with the outermost face or exposed surface of the material which it holds, whereby all parts of the fastener except said straight portion enter into and are concealed by said material and the only part of the fastener which is exposed is the short straight portion.

My invention further contemplates the provision of a pin fastener formed of a single length of wire and bent at one end portion thereof in the form of a loop so that the parts lie close together and substantially in a plane at right angles to the face of the material when the fastener is being inserted into the material and thereafter.

My invention further contemplates the provision of a one-piece wire pin fastener which cannot rock about its main pin portion when in its operative position and in which the only exposed part of the fastener when in place is a substantially straight but short portion, whereby there are no parts projecting materially above the surface of the material into which the pin fastener is inserted to catch on and possibly tear the clothing of a person.

My invention further contemplates the provision of a one-piece pin fastener of simple construction and adapted for economical production and provided with means to prevent retraction thereof by vibration when used in automobiles, the fastener being so constructed that slight retraction thereof tends to conceal more of the exposed loop part of the fastener instead of exposing more thereof.

The various objects of the invention will be clear from the description which follows and from the drawing, in which, Fig. 1 is a side elevation of a now preferred form of my improved pin fastener.

Fig. 2 is a similar view of a modified form of the fastener.

Fig. 3 is a fragmentary side elevation of another modified form of the fastener wherein a substantially 180° bend joins the ends of the main and secondary pins.

Fig. 4 is a front view of the fastener of Fig. 1 as it appears when inserted into overlying sheets of fabric in its fastening position.

Fig. 5 is a similar view of the fastener of Fig. 2.

Fig. 6 is a vertical section of Fig. 4 showing the relative positions assumed by the parts of the pin fastener and of the fabric sheets.

Fig. 7 is a similar vertical section of Fig. 5.

Fig. 8 is a fragmentary enlarged front view of the fastener of Fig. 1.

Fig. 9 is a similar view of a modified form of the fastener wherein an offset bend is formed at the top of the main pin of any of the fasteners shown in Figs. 1, 2 and 3.

Fig. 10 is a similar view of a modified form of the fastener applicable to any of the fasteners of Figs. 1, 2 and 3 and wherein the doubled back portion is not parallel to the main pin.

In the practical embodiment of the invention shown by way of example, the pin fastener is formed of a single length of wire to provide a main pin 10 of substantial length pointed at its free end 11, and a secondary pin joined to the main pin by a straight portion forming a loop with the main pin. Said straight portion in all forms of the fastener is doubled back from the end part of the length of wire toward the main pin and connected by bends, straight parts or combinations thereof to the main and secondary pins in such a manner that there is a decided spring action therebetween tending to force the straight doubled back portion into close contact with the face of the material into which the fastener is inserted, the construction also preventing rocking of said straight portion about the main pin as an axis. Furthermore, in all the forms of the fastener, the pinned material enters the space provided therefor between the straight portion and the main pin and holds said straight portion in what may be termed an "erect" position, that is, in a position such that the straight portion lies substantially in a plane passing through said portion and the main pin and substantially perpendicular to the plane of the face of the pinned material.

Referring now to Figs. 1, 4 and 8 showing a now preferred form of the invention, the doubled back straight portion hereinbefore referred to and which is the only part of the fastener exposed when the fastener is in use, is the portion 12. The secondary pin 13 is pointed at its free end 14 and is joined to the portion 12 by the bend 15. Said bend is preferably arranged in contact or nearby in contact with the main pin 10 due to the formation of the parts which connect the upper parts of the portion 12 and the main pin. As shown, the connection comprises the substantially straight part 16 and the bend 17, which serve as a spring to urge the bend 15 toward the main pin. Preferably, though not necessarily, the bend 17, the parts 16 and 12 and at least part of the bend 15 lie in the same plane, which may also be a plane passing through the main pin 10. It will be understood, however, that the planes mentioned may be parallel planes, as shown in Fig. 9, or that said planes may form an acute angle to each other as shown in Fig. 10, if desired, provided that the desirable spring action is not lost.

The angle which the secondary pin 13 makes with the main pin 10 may also be greatly varied. The angle should, however, be an acute angle so that retraction of the main pin from the material causes the secondary pin to enter further into the material in a manner which is well understood. As shown in Figs. 4 and 6, the upper end of the fastener is held between the fingers and the pointed end of the main pin is passed through the slip cover or other outer sheet of material 18 by pressure on the bend 17, the pin passing through the upholstery cover or underlying sheet 19 against the backing 20 which is usually of wood, metal or other stiff and comparatively hard material which the pin cannot enter, the main pin assuming the position shown in Fig. 6. During this operation, the sheets 18 and 19 force the bend 15 and the main pin apart, the bend moving toward the left as viewed in Figs. 1 and 6 against the spring action of the parts 16, 17, and the pin 10 being forced against the rigid backing 20 and said sheets enter the space 21 between the upper part of the main pin and the parts 12, 16. Said space is made of just sufficient width to receive said sheets, said width being substantially equal to the combined thicknesses of the sheets.

The fastener now being retracted, the secondary pin 13 pierces the sheets 18 and 19 and comes to rest against the backing 20. If the pin 13 is made long enough to extend past the main pin in its normal position, then the backing augments the action of the sheets and spreads the parts 12 and 10 apart against the spring action of the parts 16 and 17 not only to force the main pin against the backing 20 but also to maintain the portion 12 in close contact with the outer face of the sheet 18. During such retraction of the fastener, the sheets 18 and 19 ride along and pass the bend 17 and receive most or all of the part 16 to conceal said part in the interior of the sheets (Fig. 6). Part or all of the bend 15 also enters said sheets when the fastener is retracted. Consequently, only the part 12 remains exposed on the face of the sheet 18 when the fastener is in place and in its operative position. Since the fastener may readily be coated with coloring material matching the color of the sheet 18, the exposed part 12 is substantially invisible or undetectable, or if visible, presents to view only a short, substantially straight length of wire which is close to and pressed on to the sheet surface and which therefore presents no projections which might catch on the clothing of the person using the installation.

Furthermore, in view of the entrance of all of the fastener parts except the portion 12 into the material, the fastener is so held that it cannot rock as do headed or capped fasteners, and hence it cannot assume a position wherein any part thereof projects above the surface of the outer sheet even though the pin is slightly retracted owing to vibration. Such retraction has the effect not only of making the secondary pin hold tighter, but also of concealing more of the parts 16 and 12.

In that form of the invention shown in Figs. 2, 5 and 7, the straight exposable portion 22 is longer than the corresponding portion 12 of Fig. 1. The bend 23 is formed at the upper end of the portion 22, said bend being joined to the upper end of the main pin by the straight part 24. The space 25 between the parts 22, 23, 24, and 10 is practically of the same shape and size as the space 21 of Fig. 1 but reversed in position. The desired spring action of the parts 23 and 24 is therefore substantially the same as the action of the corresponding parts 17 and 16. The pin of Fig. 2 is inserted into the material in the same manner as above described in connection with Figs. 1, 4 and 6 and when so inserted assumes the position shown in Figs. 5 and 7. Said position is similar to that of Figs. 4 and 6 except that more of the fastener is exposed at 22 than at 12.

As shown in Fig. 3, the straight parts 24 or 16 of Figs. 1 and 2 may be omitted and replaced by the bend 31 extending through approximately 180° and providing a substantially rectangular space 32 between the straight portion 33 and the main pin 10.

In Fig. 8, the secondary pin 26 is shown at a slighter lesser angle to the main pin than the corresponding pins of Figs. 1 and 2. It will be understood, therefore, as hereinbefore indicated, that said angle may be greatly varied.

In Fig. 9, I have shown the secondary pin 27 in the same plane as the straight exposable doubled back portion 28. The main pin 10 however, is offset transversely from the portion 28 being joined thereto by the bend 29. In the inserted position of the fastener, the main pin lies on one side of the portion 28 and the secondary pin pierces the sheets 18 and 19 at substantially right angles to the faces thereof, but the action of the fastener is the same as has been above explained, no rocking being possible, and the sheets entering the space between the main pin 10 and the portion 28 which lies flat on the face of the sheet 18.

As shown in Fig. 10, the straight pin portion 30 may be offset laterally at an angle to the main pin 10. In this case, the portion 30 may not be parallel to the main pin when the fastener is in place in the material.

It will now be understood as indicated hereinbefore, that any of the fasteners of Figs. 1, 2 and 3 may have the connecting bends and secondary pins thereof offset as shown in Figs. 9 and 10 instead of as in Fig. 8, and it is therefore believed to be unnecessary to show each of the pins of Figs. 1, 2 and 3 modified as indicated at Figs. 9 and 10, since such illustration and description would add nothing to the understanding of the invention and would unnecessarily complicate the drawing and this description.

It will, however, be seen that I have provided a simple and inexpensive pin fastener effective to carry out the purposes herein set forth and well adapted to meet the requirements of practical use.

While I have shown and described certain specific forms of my invention, I do not wish to be understood as limiting myself thereto, but intend to claim my invention as broadly as is permitted by the state of the prior art and the scope of the appended claims.

I claim:

1. A pin fastener of a single length of wire comprising a main pin at one end part of the length, a secondary pin at the other end part of said length, and a connecting part between said pins, said connecting part comprising a first straight portion spaced from the main pin and arranged in the same general direction as and at an acute angle to the main pin and doubled back thereon, a second straight part at an obtuse angle to the first straight portion, and bent portions serving as spring members urging the pins toward each other, one of said bent portions joining the secondary pin to the first straight portion, the other of said bent portions joining the second straight part to the main pin, said second part being imbedded in and concealed by the material pinned by said fastener when the fastener is in use and cooperating with the first portion to prevent tilting of the fastener about the main pin as an axis.

2. A pin fastener of a single length of wire consisting of a terminal main pin, a terminal secondary pin and a connecting member joining said pins and serving as a spring acting upon said pins, said member including a first straight portion extending from the secondary pin in spaced relation to the main pin and providing a space therebetween for the entrance into the space of the material to be pinned, said portion being the only part of the fastener exposed outside of said material in the operative position of the fastener, and a second straight portion extending from the main pin at an obtuse angle to the first portion, said portions cooperating to prevent rocking of the fastener about the main pin as an axis and thereby preventing accidental withdrawal of the secondary pin from the material.

3. In a slip cover installation at least two thicknesses of material, a rigid backing member for the material, and a pin fastener to hold said thicknesses together comprising a main pin, a secondary pin and a spring member integral with and connecting said pins, said spring member having a first straight portion of minimum length in close contact with the outermost face of the material throughout its length and exposed when the fastener is in operative position in the material, said straight portion and the main pin lying substantially in a plane perpendicular to said outermost face, and being substantially parallel to each other, said portion extending from the secondary pin, and a second straight portion extending from the main pin at an obtuse angle to the first portion, the main and secondary pins and the second portion being imbedded in and concealed and protected by the material when the fastener is in use, whereby lateral forces acting on the exposed first portion cannot tilt the fastener about the axis of the main pin.

4. In a pin fastener having a main pin and a secondary pin, a spring connecting member integrally joining the pins, said member having a straight portion substantially parallel to the main pin and spaced therefrom sufficiently to receive therebetween the thicknesses of material to be pinned by the fastener, said straight portion being the only part of the fastener exposed outside of the material when the fastener is in its operative position, and a second straight portion of the member arranged between the main pin and the first portion and imbedded in the material in said operative position, said portions cooperating to prevent tilting of the fastener.

5. A pin fastener comprising a straight main pin, a spring bend at one end of the main pin, a first straight part extending from the bend in a direction inclined to the main pin, a second straight portion extending from the first straight part at an obtuse angle thereto and in a direction substantially parallel to the main pin, said portion being the only part of the fastener exposed when the fastener is in its operative position in the material to be pinned, and a secondary pin extending from the second straight portion and joined thereto by a bend, said straight portions and the main pin lying in a plane substantially perpendicular to the outermost face of the pinned material in the operative position of the fastener.

DANIEL I. REITER.